(12) United States Patent
Kim et al.

(10) Patent No.: US 10,991,932 B2
(45) Date of Patent: Apr. 27, 2021

(54) ROLLING DEVICE FOR ELECTRODE

(71) Applicants: Samsung Electronics Co., Ltd., Suwon-si (KR); Samsung SDI Co., Ltd., Yongin-si (KR)

(72) Inventors: Jirae Kim, Seoul (KR); Hyorang Kang, Anyang-si (KR); Youngeal Kim, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 149 days.

(21) Appl. No.: 16/371,157

(22) Filed: Apr. 1, 2019

(65) Prior Publication Data
US 2020/0185698 A1 Jun. 11, 2020

(30) Foreign Application Priority Data
Dec. 7, 2018 (KR) .......................... 10-2018-0157476

(51) Int. Cl.
*H01M 4/13* (2010.01)
*H01M 4/04* (2006.01)
*H01M 10/04* (2006.01)

(52) U.S. Cl.
CPC ........... *H01M 4/0435* (2013.01); *H01M 4/13* (2013.01); *H01M 10/0431* (2013.01)

(58) Field of Classification Search
CPC ... H01M 4/0435; H01M 4/13; H01M 10/0431
See application file for complete search history.

(56) References Cited

U.S. PATENT DOCUMENTS

| 6,761,744 | B1 | 7/2004 | Tsukamoto et al. |
| 8,173,204 | B2 | 5/2012 | Rohland |
| 2011/0008671 | A1* | 1/2011 | Miyahisa ............ H01M 10/052 429/164 |
| 2018/0201007 | A1 | 7/2018 | Chen et al. |

FOREIGN PATENT DOCUMENTS

| KR | 101255975 B1 | 4/2013 |
| KR | 101282618 B1 | 7/2013 |
| KR | 101617954 B1 | 4/2016 |
| KR | 101622437 B1 | 5/2016 |
| KR | 1020170099213 A | 8/2017 |
| KR | 1020180022039 A | 3/2018 |
| KR | 1020180081310 A | 7/2018 |

OTHER PUBLICATIONS

Lee et al. KR 20180081310. Jul. 16, 2018. English machine translation. (Year: 2018).*
Sung et al. KR20170099213. Aug. 31, 2017 English machine translation. (Year: 2017).*

* cited by examiner

*Primary Examiner* — James Lee
(74) *Attorney, Agent, or Firm* — Cantor Colburn LLP

(57) ABSTRACT

A rolling device for an electrode including an all-solid electrolyte layer, the rolling device including: a first roller including a plurality of first protrusions protruding from a surface of the first roller; and a second roller opposite the first roller, wherein the second roller comprises a plurality of second protrusions on a surface of the second roller.

15 Claims, 11 Drawing Sheets

112-1  111-1   113-1

112-2  111-2   113-2

112-3  111-3   113-3

ROLLING DEVICE FOR ELECTRODE

CROSS-REFERENCE TO RELATED APPLICATION

This application claims priority to and the benefit of Korean Patent Application No. 10-2018-0157476, filed on Dec. 7, 2018, in the Korean Intellectual Property Office, the content of which is incorporated herein in its entirety by reference.

BACKGROUND

1. Field

The present disclosure relates to a rolling device for an electrode to roll an electrode sheet used in a secondary battery, and more particularly, to a rolling device for an electrode to roll an electrode sheet used in an all-solid secondary battery including a solid electrolyte.

2. Description of the Related Art

Secondary batteries, unlike primary batteries, are batteries repeatedly charged and discharged. Small-capacity secondary batteries may be used in portable compact electronic devices such as mobile phones, notebook computers, camcorders, and large-capacity secondary batteries may be used as power sources for driving motors of hybrid vehicles and the like.

A process of manufacturing secondary batteries is classified into three stages—an electrode process, an assembly process, and a formation process. The electrode process is classified into an active material mixing process, an electrode coating process, a rolling process, a slitting process, and a winding process. Among these processes, the rolling process is a process of compressing an electrode sheet to have a desired thickness and a desired density by passing the electrode sheet through two rollers heated at a high temperature.

In all-solid secondary batteries including solid electrolytes, there is an urgent need to develop a rolling process capable of uniformly reducing a thickness of an electrode sheet after a coating process of an electrode mixture to increase capacity density and capable of increasing adhesion and closeness of contact between a solid electrolyte and an electrode active material included in the electrode mixture to avoid the problem of reduced rate capability.

SUMMARY

According to an aspect of an embodiment, a rolling device for an electrode including an all-solid electrolyte layer includes: a first roller including a plurality of first protrusions protruding from a surface of the first roller; and a second roller, opposite the first roller; and a second roller opposite the first roller, wherein the second roller includes a plurality of second protrusions protruding from a surface of the second roller.

The plurality of first protrusions may protrude from the surface of the first roller by about 1 micrometer (μm) to about 10 μm, and the plurality of second protrusions may protrude from the surface of the second roller by about 1 μm to about 10 μm.

A ratio of a total surface area of the plurality of first protrusions to a total surface area of the surface of the first roller may be in a range of about 1/5 to about 1/4, and a ratio of a total surface area of the plurality of second protrusions to a total surface area of the surface of the second roller may be in a range of about 1/5 to about 1/4.

The plurality of first protrusions and the plurality of second protrusions may have a fine protruding structure, a lattice structure, or a combination thereof.

The rolling device may further include a plurality of first gas receiving portions, wherein a first gas receiving portion of the plurality of first gas receiving portions is respectively arranged between a first protrusion of the plurality of first protrusions; and a plurality of second gas receiving portions, wherein a second gas receiving portion of the plurality of second gas receiving portions is respectively arranged between a second protrusion of the plurality of second protrusions.

The rolling device may further include a first stepped portion having a first step height from the surface of the first roller to a surface of the first stepped portion and disposed at an end of the first roller; and a second stepped portion having a second step height from the surface of the second roller to a surface of the second stepped portion and disposed at an end of the second roller.

The rolling device may further include a third roller arranged in a proceeding direction of the electrode sheet to be spaced apart from the first roller at a predetermined interval, a plurality of third protrusions protruding from a surface of the third roller and applying a pressure to a surface of the electrode sheet, a fourth roller arranged to face the third roller and applying a pressure to the electrode sheet, and a plurality of fourth protrusions protruding from a surface of the fourth roller and applying a pressure to the other surface of the electrode sheet.

A height of the plurality of first protrusions from the surface of the first roller may be greater than a height of the plurality of third protrusions from the surface of the second roller, and a height of the plurality of second protrusions from the surface of the second roller may be greater than a height of the plurality of fourth protrusions from the surface of the fourth roller.

A ratio of a total surface area of the plurality of third protrusions to a total surface area of the surface of the third roller may be in a range of about 1/5 to about 1/4, and a ratio of a total surface area of the plurality of fourth protrusions to a total surface area of the surface of the fourth roller may be in a range of about 1/5 to about 1/4.

Each of the plurality of third protrusions and the plurality of fourth protrusions may have a fine dot structure, a lattice structure, or a combination thereof.

The rolling device may further include a plurality of third gas receiving portions, wherein a third gas receiving portion of the plurality of gas receiving portions is respectively arranged between adjacent third protrusions of the plurality of third protrusions; and a plurality of fourth gas receiving portions, wherein a fourth gas receiving portion of the plurality of fourth gas receiving portions is respectively arranged between adjacent to fourth protrusions of the plurality of fourth protrusions.

The rolling device may further include a first stepped portion having a first step height from the surface of the first roller to a surface of the first stepped portion and disposed at an end of the first roller; a second stepped portion having a second step height from the surface of the second roller to a surface of the second stepped portion and disposed at an end of the second roller; a third stepped portion having a third step height from the surface of the third roller to a surface of the third stepped portion and arranged at an end of the third roller; and a fourth stepped portion having a fourth step height from the surface of the fourth roller to a surface of the fourth stepped portion and disposed at an end of the fourth roller.

The first step height from the surface of the first roller may be greater than the third step height from the surface of the third roller, and the second step height from the surface of the second roller may be greater than the fourth step height from the surface of the fourth roller.

The rolling device may further include a fifth roller arranged in a proceeding direction of the electrode sheet to be spaced apart from the third roller; and a sixth roller arranged to face the fifth roller and applying a pressure to the electrode sheet.

Both the fifth roller and the sixth roller may have a flat surface without protrusions.

The rolling device may further include a first stepped portion having a first step height from the surface of the first roller to a surface of the first stepped portion and disposed at an end of the first roller; a second stepped portion having a second step height from the second roller to a surface of the second stepped portion and disposed at an end of the second roller; a third stepped portion having a third step height from the surface of the third roller to a surface of the third stepped portion and disposed at an end of the third roller; a fourth stepped portion having a fourth step height from the surface of the fourth roller to a surface of the fourth stepped portion and disposed at an end of the fourth roller; a fifth stepped portion having a fifth step height from the surface of the fifth roller to a surface of the fifth stepped portion and disposed at an end of the fifth roller; and a sixth stepped portion having a sixth step height from the surface of the sixth roller to a surface of the sixth stepped portion and disposed at an end of the sixth roller.

The first step height from the surface of the first roller may be greater than the third step height from the surface of the third roller, and the third step height from the surface of the third may be greater than the fifth step height from the surface of the fifth roller, the second step height from the surface of the second roller may be greater than the fourth step height from the surface of the fourth roller, and the fourth step height from the surface of the fourth roller may be greater than the sixth step height from the surface of the sixth roller.

BRIEF DESCRIPTION OF THE DRAWINGS

These and/or other aspects will become apparent and more readily appreciated from the following description of the embodiments, taken in conjunction with the accompanying drawings in which:

FIGS. 2A to 2C are a perspective view of a first roller according to an exemplary embodiment, in which FIG. 2A is an expanded view of a portion of the surface of the roller of FIG. 2B, and FIG. 2C is an expanded view of a portion of the surface of the roller of FIG. 2B;

FIGS. 4A to 4C are a perspective view of a second roller according to an exemplary embodiment, in which FIG. 4A is an expanded view of a portion of the surface of the roller of FIG. 4B, and FIG. 4C is an expanded view of a portion of the surface of the roller of FIG. 4B;

DETAILED DESCRIPTION

Figure 1:
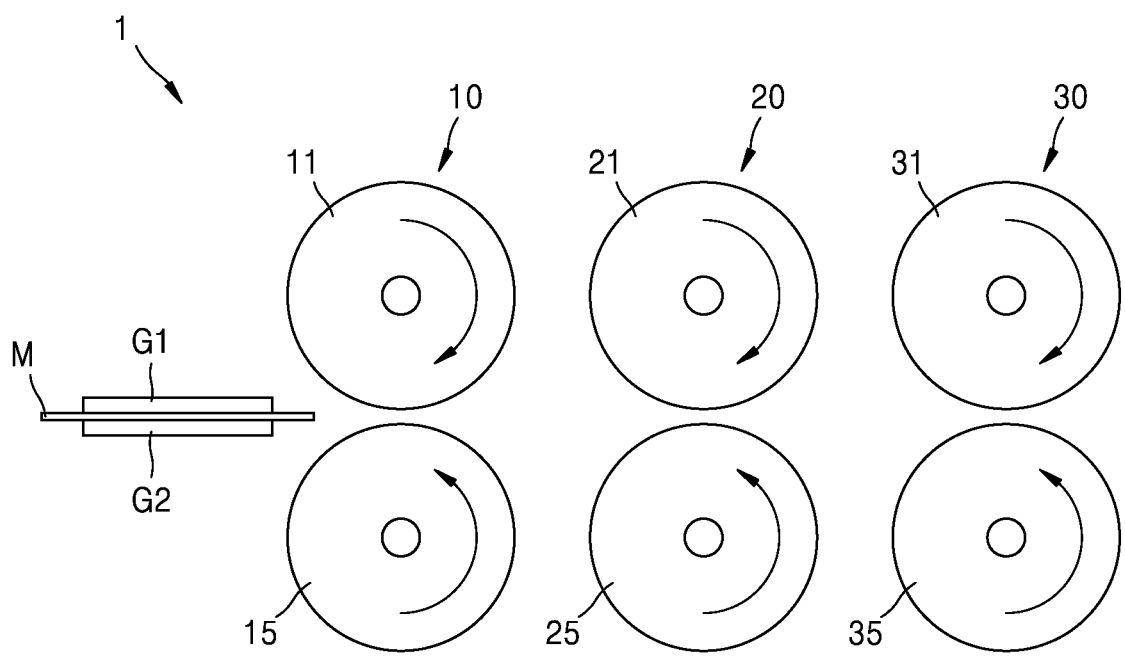
FIG. 1 is a schematic view of a rolling device for an electrode, according to an exemplary embodiment.

Reference will now be made in detail to embodiments, examples of which are illustrated in the accompanying drawings, wherein like reference numerals refer to like elements throughout. In the drawings, thicknesses of layers and regions may be exaggerated for clarity. In this regard, the present embodiments may have different forms and should not be construed as being limited to the descriptions set forth herein.

Accordingly, the embodiments are merely described below, by referring to the figures, to explain aspects. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While not wanting to be bound by theory, it is understood that poor rate capability in solid-state batteries is caused by high interfacial resistance between the electrode and the solid electrolyte. Disclosed is an electrode, and a method of manufacturing the same, in which the contact between the electrode and solid electrolyte material is improved, resulting in improved interfacial resistance, and thus improved rate capability.

FIG. 1 is a schematic view of a rolling device for an electrode, according to an exemplary embodiment.

Referring to FIG. 1, a rolling device 1 for an electrode, according to an exemplary embodiment of the disclosure, may include a first roller group 10, a second roller group 20, and a third roller group 30. An electrode sheet 40 may be wound on a feeding roll (not shown) positioned in front of the first roller group 10. After sequentially passing through the first roller group 10, the second roller group 20, and the third roller group 30 from the feeding roll, the electrode sheet 40 may be wound on a rewinder (not shown).

The first roller group 10 may include a first roller 11 and a second roller 15 respectively positioned at an upper side and a lower side of a region of the electrode sheet 40 passing therethrough. In this regard, the first roller 11 and the second roller 15 may be configured to rotate in opposite directions to transmit the electrode sheet 40 therethrough.

The second roller group 20 may be arranged downstream from the first roller group 10 at a predetermined interval in a proceeding direction of the electrode sheet 40. The second roller group 20 may include a third roller 21 and a fourth roller 25 respectively positioned at an upper side and a lower side of a region of the electrode sheet 40 passing therethrough. In this regard, the third roller 21 and the fourth roller 25 may be configured to rotate in opposite directions to transmit the electrode sheet 40 therethrough.

The third roller group 30 may be arranged downstream from the second roller group 20 at a predetermined interval in the proceeding direction of the electrode sheet 40. The third roller group 30 may include a fifth roller 31 and a sixth roller 35 respectively positioned at an upper side and a lower side of a region of the electrode sheet 40 passing therethrough. In this regard, the fifth roller 31 and the sixth roller 35 may be configured to rotate in opposite directions to transmit the electrode sheet 40 therethrough.

The electrode sheet 40 passing through the first, second, and third roller groups 10, 20, and 30 may have a structure in which electrode mixture layers G1 and G2 are coated on both surfaces of an all-solid electrolyte layer M. An electrode current collector may be interposed between the electrode mixture layers G1 and G2 as an adhesive layer. Although FIG. 1 illustrates the structure in which the electrode mixture layers G1 and G2 are coated on the both surfaces of the all-solid electrolyte layer M for convenience of description, either of the electrode mixture layers G1 and G2 may also be coated on a surface of the all-solid electrolyte layer M as desired.

Figure 2A:
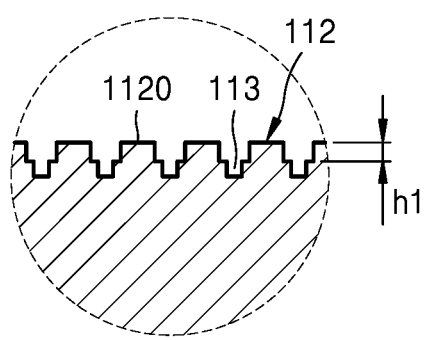
Figure 2B:
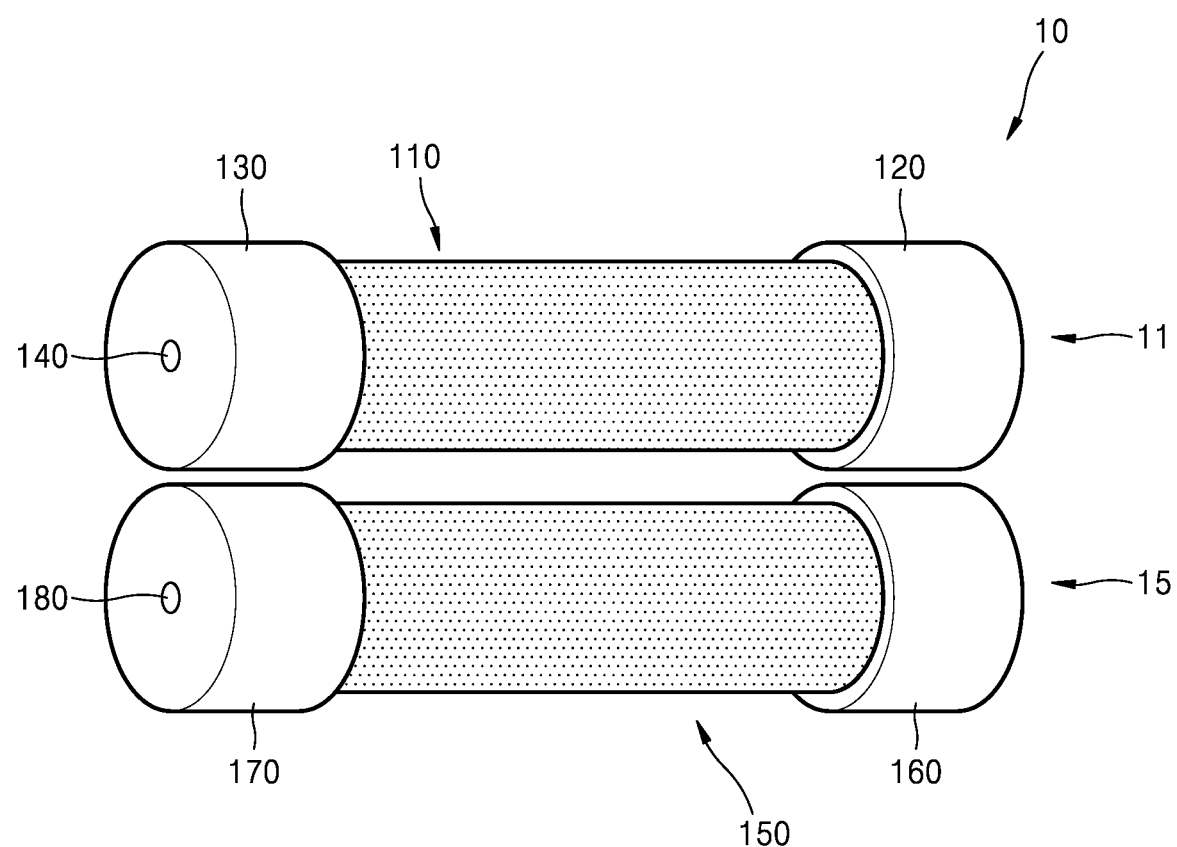
Figure 2C:
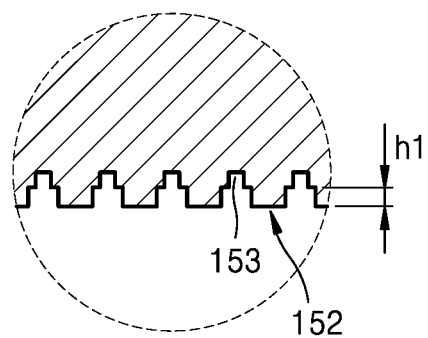
Figure 2D:
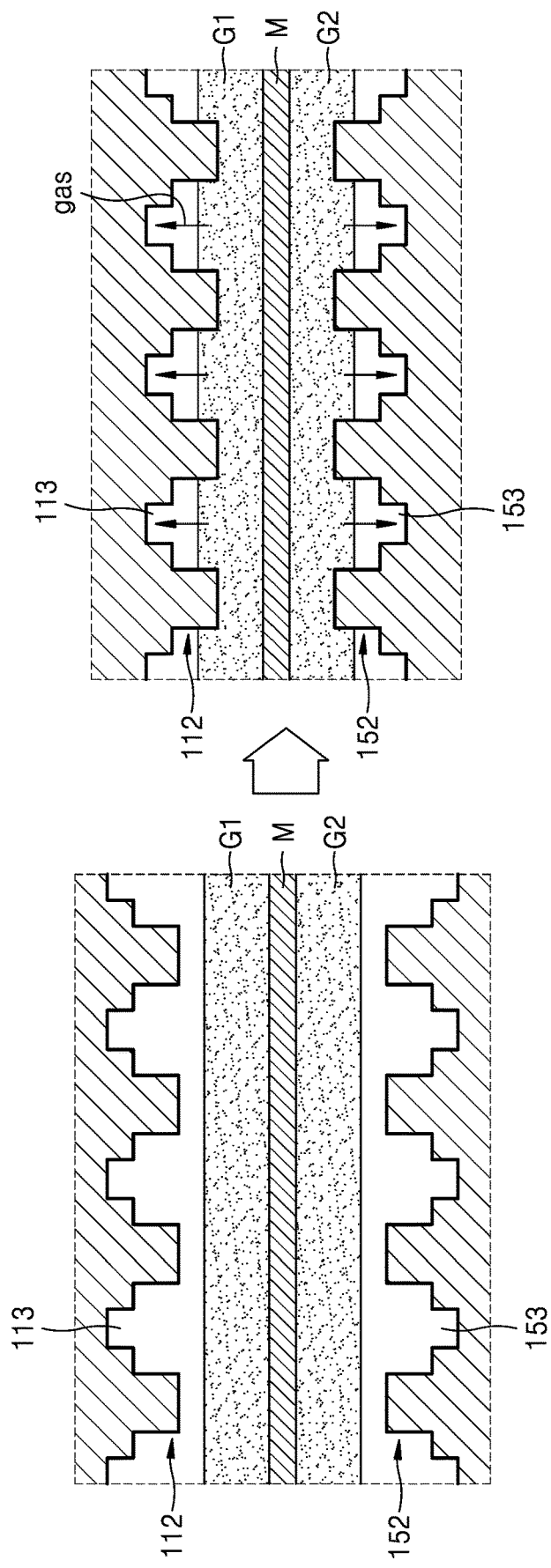
FIG. 2D is a schematic view of an exemplary embodiment illustrating a state in which protrusions shown in FIGS. 2A and 2C are in contact with an electrode sheet.
Figure 3A:
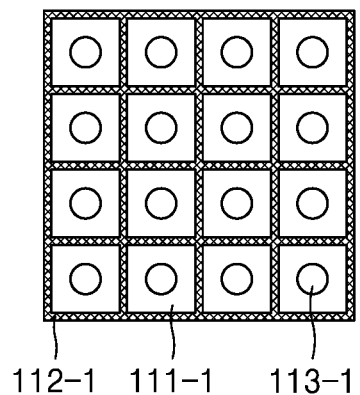
FIG. 3A to FIG. 3C are a partially enlarged view of a plurality of first protrusions according to an exemplary embodiment.
Figure 3B:
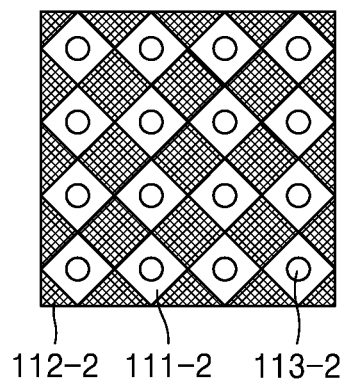
Figure 3C:
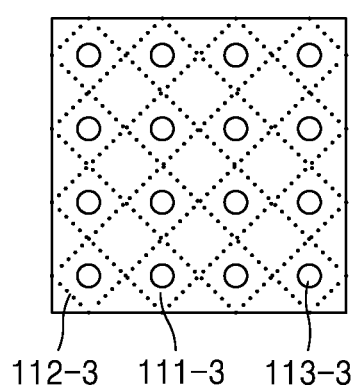

FIG. 2A is a perspective view of a first roller according to an exemplary embodiment. FIG. 2D is a schematic view of an exemplary embodiment illustrating a state in which protrusions shown in FIG. 2A are in contact with an electrode sheet. FIG. 3A to FIG. 3C are a partially enlarged view of a plurality of first protrusions according to an exemplary embodiment.

Referring to FIGS. 2A to 2D, the first roller group 10 according to an exemplary embodiment may include the first roller 11 extending in direction and rotating about shaft 140, and the second roller 15 extending in direction, rotating about shaft 180, and arranged to face the first roller 11.

The first roller 11 according to an exemplary embodiment may have cylindrical surface 110 capable of applying a pressure to the electrode sheet 40, more particularly, to the electrode mixture layer G1 illustrated in FIG. 1. For example, the surface 110 of the first roller 11 may include a plurality of first protrusions 112 protruding from the surface 110 of the first roller 11 and a first gas receiving portion of the plurality of first gas receiving portions 113 adjacent a first protrusion of the plurality of first protrusions 112.

The plurality of first protrusions 112 may protrude from the surface 110 of the first roller 11 by a first height h1, for example, about 1 μm to about 10 μm. For example, the plurality of first protrusions 112 may be provided in fine protruding shapes uniformly arranged over the entire area of the surface 110 of the first roller 11. According to an embodiment, the plurality of first protrusions 112 may be provided in a combination of a plurality of dots or a plurality of lattice structures. For example, the plurality of first protrusions 112 may be provided in a plurality of dot-shaped fine protruding structures having a predetermined height as illustrated in FIG. 2A. Also, the plurality of first protrusions 112 may be provided in a plurality of diamond-shaped protrusions 112-2 having a predetermined height as shown in FIG. 3B, or in a lattice structure 112-1 having a plurality of square-shaped protrusions having a predetermined height as illustrated in FIG. 3A or in a lattice structure 112-3 having a plurality of protrusions constituting partition walls having a predetermined height as illustrated in FIG. 3C. In this regard, a gas receiving portion of the plurality of gas receiving portions 113-1 to 113-3 illustrated in FIG. 3A to FIG. 3B may be adjacent to the above-described protrusions of the plurality of protrusions.

According to the related art, the electrode mixture layers G1 and G2 may have a predetermined thickness and the thickness of the electrode mixture layers G1 and G2 may gradually decrease while passing between the rotating first roller 11 and second roller 15. At this time, previously rolled portions of the electrode mixture layers G1 and G2 may partially be forced to move in one direction, for example, backward upstream of the electrode mixture layers G1 and G2. Accordingly, a thickness of portions of the electrode mixture layers G1 and G2 to be rolled later may be greater than a thickness of the already-rolled portions of the electrode mixture layers G1 and G2, and thus the electrode mixture layers G1 and G2 may non-uniformly be rolled.

The plurality of first protrusions 112 according to an embodiment may support surfaces of the electrode mixture layers G1 and G2 being pressed such that the previously rolled portions of the electrode mixture layers G1 and G2 are not partially, non-uniformly forced to move in direction. For example, as illustrated in FIG. 2D, the plurality of first protrusions 112 may form fine grooves on the electrode mixture layer G1 during a process of pressing the electrode mixture layer G1 by using the first roller 11. In this case, because the electrode mixture layer G1 is supported at regions facing the plurality of first protrusions 112, the electrode mixture layer G1 may be prevented from being forced to move backward. Accordingly, the electrode mixture layer G1 may be rolled to have a relatively uniform thickness.

As an example, a ratio of a total surface area of the plurality of first protrusions 112 to a total area of the surface 110 of the first roller 11 may be in a predetermined range, e.g., a range of about 1/5 to about 1/4. When the ratio of the total surface area of the plurality of first protrusions 112 to the total area of the surface 110 of the first roller 11 is outside of the range, the plurality of first protrusions 112 cannot easily perform the function of supporting the pressed surface of the electrode mixture layer G1, and the electrode mixture layer G1 may be rolled non-uniformly due to different rolling degrees between the regions supported by the plurality of first protrusions 112 and the other regions.

The gas receiving portion 113 of the plurality of first gas receiving portions respectively arranged between first protrusions 112 of the plurality of first protrusions may receive gases generated during the rolling process. For example, unnecessary gases may be introduced or generated from the outside or from the electrode mixture layer G1 and the all-sold electrolyte layer M during the process of rolling the electrode mixture layer G1. When the unnecessary gases are present between the electrode mixture layer G1 and the surface 110 of the first roller 11, a pressing force may non-uniformly be applied to the electrode mixture layer G1. The first gas receiving portion 113 of the plurality of first gas receiving portions are spaces for receiving the gases that may be generated or introduced during the rolling process. For example, the first gas receiving portions 113 may respectively be arranged between adjacent first protrusions 112 of the plurality of first protrusions. Accordingly, the unnecessary gases disposed between the plurality of first protrusions 112 and the electrode mixture layer G1 are contained in the first gas receiving portions 113, and thus the pressing force may uniformly be applied to the electrode mixture layer G1.

Figure 6:
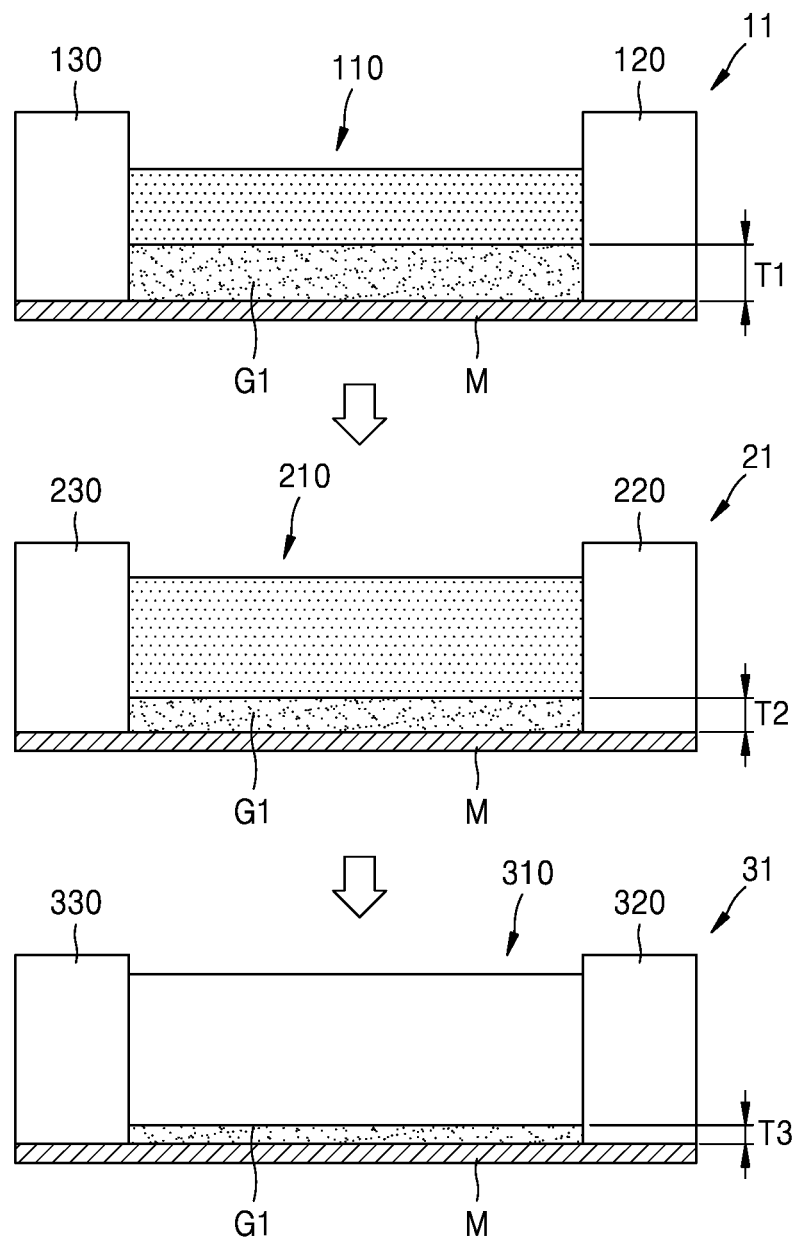
FIG. 6 is a schematic view illustrating a process of rolling an electrode mixture layer by using a first roller, a third roller, and a fifth roller according to an exemplary embodiment.

First stepped portions 120 and 130 may be arranged to have a first step heights from the surface 110 of the first roller 11 to the surfaces of the first stepped portions. As an example, a plurality of first stepped portions 120 and 130 may be provided at both ends of the first roller 11. As illustrated in FIGS. 1 and 6, the electrode sheet 40 may include a coated region in which the electrode mixture layers G1 and G2 are coated on both surfaces of a sheet-shaped all-solid electrolyte layer M extending in one direction and an uncoated region in which the all-solid electrolyte layer M is not coated with the electrode mixture layers G1 and G2. In this case, the electrode mixture layers G1 and G2 are formed to extend along a lengthwise direction of the all-solid electrolyte layer M to have a predetermined width, and the uncoated regions may be formed at both ends of the electrode mixture layer G1 along the lengthwise direction of the all-solid electrolyte layer M.

As an example, the first stepped portions 120 and 130 are arranged to face the above-described uncoated regions, i.e., the all-solid electrolyte layer M on which the electrode mixture layers G1 and G2 are not formed, to apply a pressure to the all-solid electrolyte layer M. A distance between the first stepped portions 120 and 130 disposed at the both ends may be set to correspond to a width of the electrode mixture layer G1, and a first step height T1 of the first stepped portions 120 and 130 from the surface 110 of the first roller 11 to the surfaces of the first stepped portions may be set to correspond to a thickness of the electrode mixture layer G1.

The second roller 15 according to an embodiment may include a surface 150 capable of applying a pressure to the electrode sheet 40, more particularly, to the electrode mixture layer G2 illustrated in FIG. 1. A second protrusion 152 of the plurality of second protrusions protrudes from the surface 150 of the second roller 15, a second gas receiving portion 153 of the plurality of second gas receiving portions is adjacent a second protrusion 152 of the plurality of second protrusions, and second stepped portions 160 and 170 are disposed at both ends of the second roller 15. The first roller 11 and the second roller 15 are arranged to correspond to each other and have a substantially similar configuration except that different electrode mixture layers G2 are rolled. Thus, detailed descriptions of the configuration of the second roller 15 will not be repeated for convenience of description.

Figure 4A:
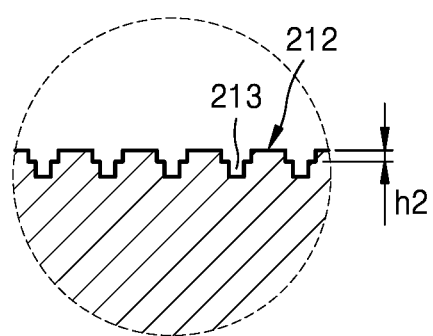

FIG. 4A is a perspective view of a second roller according to an exemplary embodiment. A second roller 20 illustrated in FIG. 4A is the similar to the first roller 10 illustrated in FIG. 2A. A second height h2 of each of the third protrusions 212 and the fourth protrusions 252 are less than the first height h1 of the first protrusions 112 and the second protrusions 152; and a third step height T2 of each of third stepped portions 220 and 230 and fourth stepped portions 260 and 270 disposed at both ends of the third roller 21 and the fourth roller 25, respectively, are less than the step height T1 of each of the first stepped portions 120 and 130 and the second stepped portions 160 and 170.

Figure 4B:
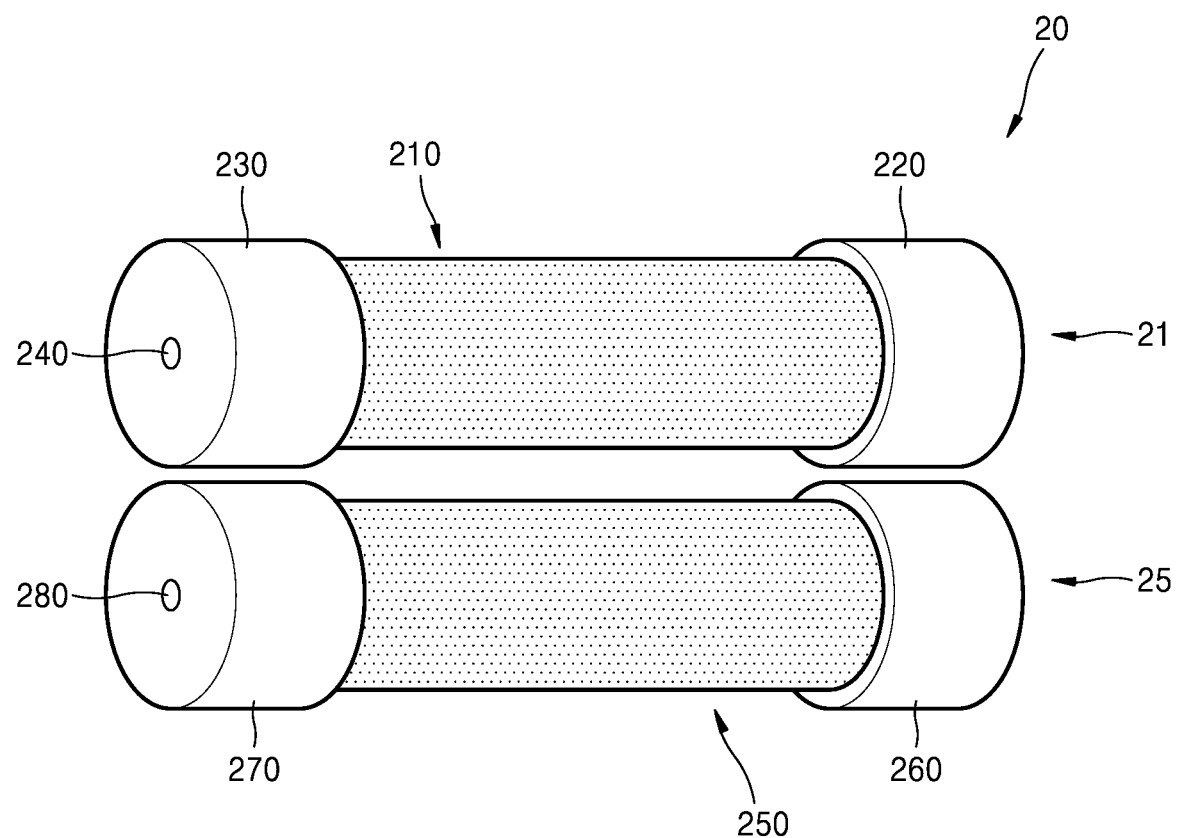
Figure 4C:
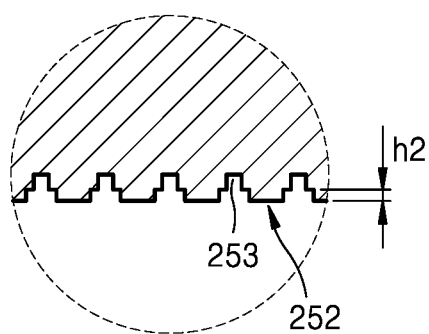

Referring to FIG. 4B, the second roller 20 according to an exemplary embodiment may include the third roller 21 extending in a direction and rotating about a shaft 240 and the fourth roller 25 extending in a direction, rotating about a shaft 280, and opposite the third roller 21.

The third roller 21 according to an embodiment may have a cylindrical surface 210 extending in a direction and capable of applying a pressure to the electrode mixture layer G1 having passed through the first roller 11. For example, the surface 210 of the third roller 21 may include a plurality of third protrusions 212 protruding from the surface 210 of the third roller 21 and a third gas receiving portion of the plurality of third gas receiving portions 213 arranged between third protrusions of the plurality of third protrusions 212.

The plurality of third protrusions 212 may protrude from the surface 210 of the third roller 21 by a second height h2, for example, about 1 μm to about 10 μm. In this case, the second height h2 that is a height of the plurality of third protrusions 212, may be less than the first height h1 that is a height of the plurality of first protrusions 112 illustrated in FIG. 2A. For example, the plurality of third protrusions 212 may be provided in fine protruding shapes uniformly arranged over the entire area of the surface 210 of the third roller 21. According to an embodiment, the plurality of third protrusions 212 may be provided in a combination of a plurality of dots or a plurality of lattice structures. Also, as an example, a ratio of a total surface of the plurality of third protrusions 212 to a total area of the surface 210 of the third roller 21 may be in a predetermined range, e.g., a range of 1/5 to 1/4. The shape and the area ratio of the plurality of third protrusions 212 are substantially similar to those of the plurality of first protrusions 112, and thus detailed descriptions thereof will not be repeated.

The third gas receiving portion of the plurality of third gas receiving portions 213 arranged between third protrusions of the plurality of third protrusions 212 may receive gases generated during the rolling process. For example, a third gas receiving portion 213 of the plurality of third gas receiving portions may be arranged between third protrusions 212 of the plurality of third protrusions. Thus, gases present between the plurality of third protrusions 212 and the electrode mixture layer G1 are contained in the third gas receiving portions 213 allowing a pressure to be uniformly applied to the electrode mixture layer G1.

The third stepped portions 220 and 230 may have predetermined third step heights from the surface 210 of the third roller 21 to a surface of the third stepped portion. As an example, a plurality of third stepped portions 220 and 230 may be provided at both ends of the third roller 21. A distance between the third stepped portions 220 and 230 arranged at the ends, e.g., both ends, may be set to correspond to the width of the electrode mixture layer G1; and the step height T2 of the third stepped portions 220 and 230 from the surface 210 of the third roller 21 may be set to correspond to a thickness of the electrode mixture layer G1. In this case, the thickness of the electrode mixture layer G1 may decrease while being passed through the first roller group 10, and the third step height T2 of the third stepped portions 220 and 230 may be less than the first step height T1 of the first stepped portions 120 and 130 as illustrated in FIG. 6.

The fourth roller 25 according to an embodiment may include a surface 250 capable of applying a pressure to the electrode sheet 40, more particularly, to the electrode mixture layer G2 illustrated in FIG. 1. According to an embodiment, a fourth protrusion of the plurality of fourth protrusions 252 protrude from the surface 250 of the fourth roller 25, a fourth gas receiving portion 253 of the plurality of fourth gas receiving portions is adjacent the fourth protrusion 252 of the plurality of fourth protrusions, and fourth stepped portions 260 and 270 are disposed at both ends of the fourth roller 25. The third roller 21 and the fourth roller 25 are arranged to correspond to each other and have a substantially similar configuration except that different electrode mixture layers G2 are rolled. Thus, detailed descriptions of the configuration of the fourth roller 25 will not be repeated for convenience of description.

Figure 5:
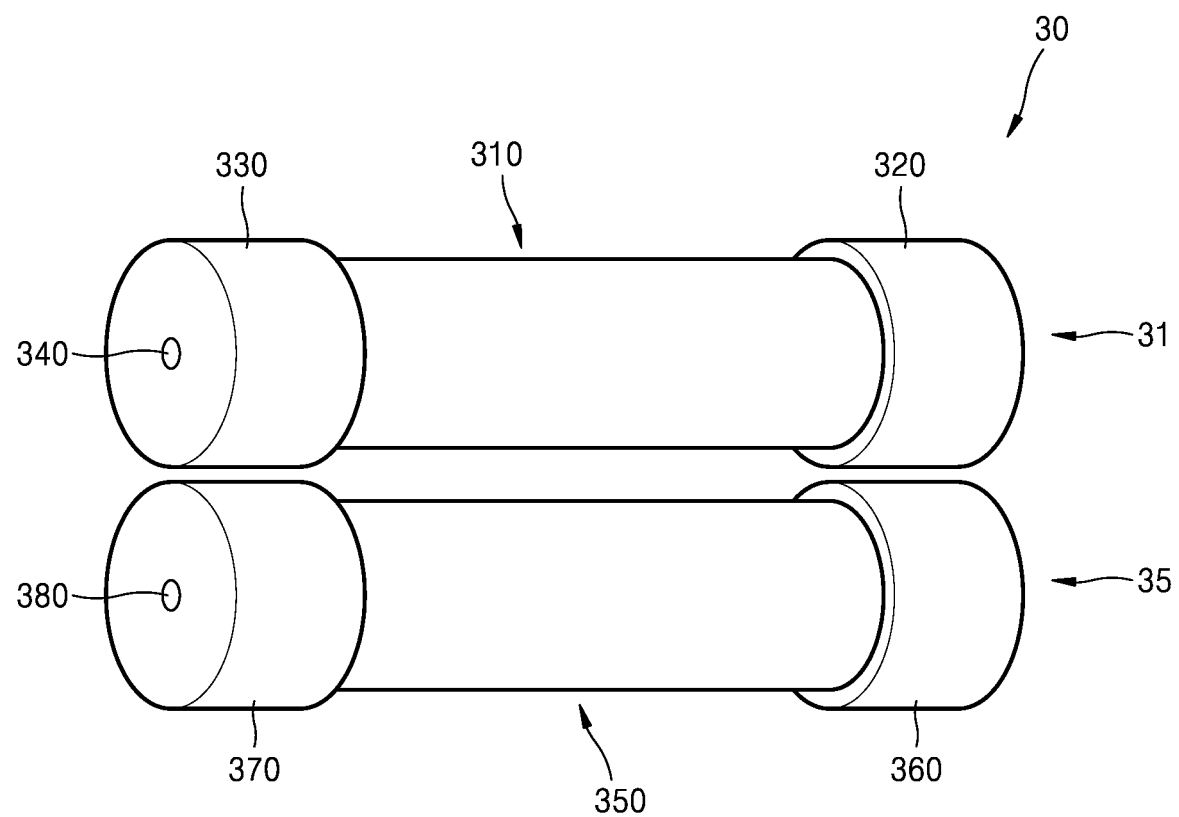
FIG. 5 is a perspective view of a third roller according to an exemplary embodiment.

FIG. 5 is a perspective view of a third roller according to an exemplary embodiment. FIG. 6 is a schematic view illustrating a process of rolling an electrode mixture layer by using a first roller, a third roller, and a fifth roller according to an exemplary embodiment.

Referring to FIG. 5, a third roller group 30 according to an embodiment may include a fifth roller 31 extending in a direction and rotating about a shaft 340 and a sixth roller 35 extending in a direction, rotating about a shaft 380, and arranged to face the fifth roller 31.

The fifth roller 31 according to an embodiment may have a cylindrical surface 310 capable of applying a pressure to the electrode mixture layer G1 having passed through the third roller 21 and extending in a direction. In this case, the surface 310 of the fifth roller 31 may be provided as a flat surface on which protrusions and gas receiving portions are not arranged. As illustrated in FIG. 6, in the case where the thickness of the electrode mixture layer G1 is sufficiently thin after passing through the first roller group 10 and the second roller group 20, is within an acceptable range in the electrode mixture layers G1 and G2. Thus, the surface 310 of the fifth roller 31 may be a flat surface without protrusions and gas receiving portions to apply a uniform pressure to the entire area of the electrode mixture layers G1 and G2.

Fifth stepped portions 320 and 330 may be arranged to have predetermined fifth step heights from the surface 310 of the fifth roller 31 to the surface of the fifth stepped portions. As an example, a plurality of fifth stepped portions 320 and 330 may be provided at both ends of the fifth roller 31. A distance between the fifth stepped portions 320 and 330 disposed at the both ends of the fifth roller 31 may be set to correspond to the width of the electrode mixture layer G1, and the fifth step height T3 of the fifth stepped portions 320 and 330 from the surface 310 of the fifth roller 31 may be set to correspond to a thickness of the electrode mixture layer G1. In this case, the thickness of the electrode mixture layer G1 may decrease while being passed through the second roller group 20, and the fifth step height T3 of the fifth stepped portions 320 and 330 may be less than the third step height T2 of the third stepped portions 220 and 230 as illustrated in FIG. 6.

The sixth roller 35 according to an embodiment may include surface 350 capable of applying a pressure to the electrode sheet 40, more particularly, to the electrode mixture layer G2 illustrated in FIG. 1, and sixth stepped portions 360 and 370 disposed at both ends of the sixth roller 35. The fifth roller 31 and the sixth roller 35 are arranged to correspond to each other and have a substantially similar configuration except that different electrode mixture layers G2 are rolled. Thus, detailed descriptions of the configuration of the sixth roller 35 will not be repeated for convenience of description.

As described above, the heights of the plurality of protrusions and the step heights of the stepped portions may vary according to the thicknesses of the electrode mixture layers G1 and G2 while the electrode sheet 40 passes through the first, second, and third roller groups 10, 20, and 30. Accordingly, the thickness of the electrode sheet 40 may uniformly be reduced after a process of coating the electrode mixture layers G1 and G2 is completed, and interfacial resistance between the electrodes and the solid electrolyte may be reduced by increasing adhesion and closeness of contact between the all-solid electrolyte layer M and the electrode materials included in the electrode mixture layers G1 and G2.

According to the embodiments of the present disclosure, a rolling device for an electrode capable of uniformly reducing a thickness of an electrode sheet after a coating process of an electrode mixture is completed is provided as described above. Also, a rolling device for an electrode capable of reducing interfacial resistance by increasing adhesion and closeness of contact between the all-solid electrolyte layer M and the electrode materials included in the electrode mixture layers G1 and G2 may be provided.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A rolling device for an electrode comprising an all-solid electrolyte layer, the rolling device comprising:
    a first roller comprising a plurality of first protrusions protruding from a surface of the first roller;
    a second roller opposite the first roller, wherein the second roller comprises a plurality of second protrusions on a surface of the second roller;
    a third roller disposed in a proceeding direction relative to the first roller;
    a plurality of third protrusions protruding from a surface of the third roller;
    a fourth roller disposed opposite the third roller; and
    a plurality of fourth protrusions protruding from a surface of the fourth roller
    wherein a height of the plurality of first protrusions relative to the surface of the first roller is greater than a height of the plurality of third protrusions relative to the surface of the second roller, and
    a height of the plurality of second protrusions relative to the surface of the first roller is greater than a height of the plurality of fourth protrusions relative to the surface of the fourth roller.

2. The rolling device of claim 1, wherein the plurality of first protrusions protrude about 1 micrometer to about 10 micrometers from the surface of the first roller, and
    wherein the plurality of second protrusions protrude about 1 micrometer to about 10 micrometers from the surface of the second roller.

3. The rolling device of claim 1, wherein a ratio of a total surface area of the plurality of first protrusions to a total surface area the surface of the first roller is in a range of about 1/5 to about 1/4, and
    a ratio of a total surface area of the plurality of the second protrusions to a total surface area the surface of the second roller is in a range of about 1/5 to about 1/4.

4. The rolling device of claim 1, wherein the plurality of first protrusions and the plurality of second protrusions comprise a protruding structure, a lattice structure, or a combination thereof.

5. The rolling device of claim 1, further comprising a plurality of first gas receiving portions, wherein a first gas receiving portion of the plurality of first gas receiving portions is adjacent to a first protrusion of the plurality of first protrusions; and
    a plurality of second gas receiving portions, wherein a second gas receiving portion of the plurality of gas receiving portions is adjacent to a second protrusion of the plurality of second protrusions.

6. The rolling device of claim 1, further comprising a first stepped portion comprising a first step height from the surface of the first roller to a surface of the first stepped portion and disposed at an end of the first roller; and
    a second stepped portion comprising a second step height from the surface of the second roller to a surface of the second stepped portion and disposed at an end of the second roller.

7. The rolling device of claim 1, wherein a ratio of a total surface area of the plurality of third protrusions to a total surface area the surface of the third roller is in a range of about 1/5 to about 1/4, and
    a ratio of a total surface area of the plurality of fourth protrusions to a total surface area of the surface the fourth roller is in a range of about 1/5 to about 1/4.

8. The rolling device of claim 1, wherein the plurality of third protrusions and the plurality of fourth protrusions each independently comprise a dot structure, a lattice structure, or a combination thereof.

9. The rolling device of claim 1, further comprising a plurality of third gas receiving portions, wherein a third gas receiving portion of the plurality of third gas receiving portions is disposed between third protrusions of the plurality of third protrusions; and
    a plurality of fourth gas receiving portions, wherein a fourth gas receiving portion of the plurality of fourth gas receiving portions is disposed between fourth protrusions of the plurality of fourth protrusions.

10. The rolling device of claim 1, further comprising:
    a first stepped portion comprising a first step height from the surface of the first roller to a surface of the first stepped portion and disposed at an end of the first roller;
    a second stepped portion comprising a second step height from the second roller to a surface of the second stepped portion and disposed at an end of the second roller;
    a third stepped portion comprising a third step height from the surface of the third roller to a surface of the third stepped portion and disposed at an end of the third roller; and
    a fourth stepped portion comprising a fourth step height from the surface of the fourth roller to a surface of the fourth stepped portion and disposed at an end of the fourth roller.

11. The rolling device of claim 1, further comprising:
    a fifth roller disposed in a proceeding direction relative to the third roller; and
    a sixth roller opposite the fifth roller.

12. The rolling device of claim 11, wherein both the fifth roller and the sixth roller comprise a flat surface without protrusions.

13. The rolling device of claim 11, further comprising:
    a first stepped portion comprising a first step height from the surface of the first roller to a surface of the first stepped portion and disposed at an end of the first roller;
    a second stepped portion comprising a second step height from the second roller from the surface of the second roller to a surface of the second stepped portion and disposed at an end of the second roller;
    a third stepped portion comprising a third step height from the surface of the third roller to a surface of the third stepped portion and disposed at an end of the third roller;
    a fourth stepped portion comprising a fourth step height from the surface of the fourth roller to a surface of the fourth stepped portion and disposed at an end of the fourth roller;
    a fifth stepped portion comprising a fifth step height from the surface of the fifth roller to a surface of the fifth stepped portion and disposed at an end of the fifth roller; and
    a sixth stepped portion comprising a sixth step height from the surface of the sixth roller to a surface of the sixth stepped portion and disposed at an end of the sixth roller.

14. A rolling device for an electrode comprising an all-solid electrolyte layer, the rolling device comprising:

a first roller comprising a plurality of first protrusions protruding from a surface of the first roller;

a second roller opposite the first roller, wherein the second roller comprises a plurality of second protrusions on a surface of the second roller;

a third roller disposed in a proceeding direction relative to the first roller;

a plurality of third protrusions protruding from a surface of the third roller;

a fourth roller disposed opposite the third roller;

a plurality of fourth protrusions protruding from a surface of the fourth roller;

wherein the rolling device further comprises a first stepped portion comprising a first step height from the surface of the first roller to a surface of the first stepped portion and disposed at an end of the first roller; a second stepped portion comprising a second step height from the second roller to a surface of the second stepped portion and disposed at an end of the second roller; a third stepped portion comprising a third step height from the surface of the third roller to a surface of the third stepped portion and disposed at an end of the third roller; and a fourth stepped portion comprising a fourth step height from the surface of the fourth roller to a surface of the fourth stepped portion and disposed at an end of the fourth roller, wherein the first step height is greater than the third step height, and the second step height is greater than the fourth step height; or a fifth roller disposed in a proceeding direction relative to the third roller; and a sixth roller opposite the fifth roller, wherein both the fifth roller and the sixth roller comprise a flat surface without protrusions.

15. A rolling device for an electrode comprising an all-solid electrolyte layer, the rolling device comprising:

a first roller comprising a plurality of first protrusions protruding from a surface of the first roller;

a second roller opposite the first roller, wherein the second roller comprises a plurality of second protrusions on a surface of the second roller;

a third roller disposed in a proceeding direction relative to the first roller;

a plurality of third protrusions protruding from a surface of the third roller;

a fourth roller disposed opposite the third roller;

a plurality of fourth protrusions protruding from a surface of the fourth roller;

a fifth roller disposed in a proceeding direction relative to the third roller;

a sixth roller opposite the fifth roller, a first stepped portion comprising a first step height from the surface of the first roller to a surface of the first stepped portion and disposed at an end of the first roller;

a second stepped portion comprising a second step height from the second roller from the surface of the second roller to a surface of the second stepped portion and disposed at an end of the second roller;

a third stepped portion comprising a third step height from the surface of the third roller to a surface of the third stepped portion and disposed at an end of the third roller;

a fourth stepped portion comprising a fourth step height from the surface of the fourth roller to a surface of the fourth stepped portion and disposed at an end of the fourth roller;

a fifth stepped portion comprising a fifth step height from the surface of the fifth roller to a surface of the fifth stepped portion and disposed at an end of the fifth roller; and a sixth stepped portion comprising a sixth step height from the surface of the sixth roller to a surface of the sixth stepped portion and disposed at an end of the sixth roller, wherein the first step height is greater than the third step height, and the third step height is greater than the fifth step height, and the second step height is greater than the fourth step height, and the fourth step height is greater than the sixth step height.

* * * * *